United States Patent
Venneri et al.

(10) Patent No.: US 9,299,464 B2
(45) Date of Patent: *Mar. 29, 2016

(54) FULLY CERAMIC NUCLEAR FUEL AND RELATED METHODS

(75) Inventors: Francesco Venneri, Los Alamos, NM (US); Yutai Katoh, Oak Ridge, TN (US); Lance Lewis Snead, Knoxville, TN (US)

(73) Assignees: UT-BATTELLE, LLC, Oak Ridge, TN (US); LOGOS TECHNOLOGIES LLC, Fairfax, VA (US)

( * ) Notice: Subject to any disclaimer, the term of this patent is extended or adjusted under 35 U.S.C. 154(b) by 1184 days.

This patent is subject to a terminal disclaimer.

(21) Appl. No.: 12/959,115

(22) Filed: Dec. 2, 2010

(65) Prior Publication Data

US 2012/0140867 A1    Jun. 7, 2012

(51) Int. Cl.
*G21C 21/00* (2006.01)
*G21C 21/02* (2006.01)
*G21C 3/20* (2006.01)
*G21C 3/62* (2006.01)
*G21C 21/04* (2006.01)

(52) U.S. Cl.
CPC *G21C 21/02* (2013.01); *G21C 3/20* (2013.01); *G21C 3/62* (2013.01); *G21C 3/626* (2013.01); *G21C 21/04* (2013.01); *Y02E 30/38* (2013.01)

(58) Field of Classification Search
CPC .......... G21C 3/626; G21C 3/20; G21C 3/042
USPC .......... 376/412, 414, 419, 434, 901
See application file for complete search history.

(56) References Cited

U.S. PATENT DOCUMENTS

| | | | |
|---|---|---|---|
| 3,907,948 A | 9/1975 | Gyarmati et al. | |
| 4,707,330 A | 11/1987 | Ferrari | |
| 4,869,886 A * | 9/1989 | Saiki | C01B 31/36 423/345 |
| 4,978,480 A * | 12/1990 | Stansfield | G21C 3/626 264/0.5 |
| 5,805,657 A * | 9/1998 | Heubeck | B82Y 30/00 376/427 |
| 6,162,543 A * | 12/2000 | Dubots | C04B 35/573 428/306.6 |
| 8,475,747 B1 * | 7/2013 | Johnson | B01D 9/00 252/625 |
| 2003/0113447 A1 * | 6/2003 | Sherwood et al. | 427/221 |

(Continued)

FOREIGN PATENT DOCUMENTS

WO    WO 2008071676 A1 *    6/2008
WO    WO-2010/086431 A1    8/2010

OTHER PUBLICATIONS

M. K. Meyer et al., Fuel Development for Gas-Cooled Fast Reactors, Journal of Nuclear Materials, 371 (2007), pp. 281-287.

(Continued)

*Primary Examiner* — Timothy A Brainard
(74) *Attorney, Agent, or Firm* — Drinker Biddle & Reath LLP

(57) ABSTRACT

Various embodiments of a nuclear fuel for use in various types of nuclear reactors and/or waste disposal systems are disclosed. One exemplary embodiment of a nuclear fuel may include a fuel element having a plurality of tristructural-isotropic fuel particles embedded in a silicon carbide matrix. An exemplary method of manufacturing a nuclear fuel is also disclosed. The method may include providing a plurality of tristructural-isotropic fuel particles, mixing the plurality of tristructural-isotropic fuel particles with silicon carbide powder to form a precursor mixture, and compacting the precursor mixture at a predetermined pressure and temperature.

14 Claims, 3 Drawing Sheets

(56) References Cited

U.S. PATENT DOCUMENTS

| | | | |
|---|---|---|---|
| 2006/0039524 A1* | 2/2006 | Feinroth | C04B 35/806 376/409 |
| 2008/0159464 A1* | 7/2008 | Futterer | G21C 19/34 376/308 |
| 2009/0032178 A1* | 2/2009 | Feinroth | 156/143 |
| 2010/0290578 A1* | 11/2010 | Farrell | G21C 1/086 376/361 |
| 2010/0296621 A1* | 11/2010 | Broli et al. | 376/411 |
| 2011/0091004 A1* | 4/2011 | Farmer | G21B 1/01 376/412 |
| 2011/0317794 A1* | 12/2011 | Venneri et al. | 376/170 |

OTHER PUBLICATIONS

K. D. Weaver et al., Gen IV Nuclear Energy Systems: Gas-Cooled Fast Reactor (GFR), FY-04 Annual Report, Sep. 2004, Idaho National Engineering and Environmental Laboratory, INEEL/EXT-04-02361.

Sterbentz, J.W. et al., "Reactor Physics Parametric and Depletion Studies in Support of TRISO Particle Fuel Specification for the Next Generation Nuclear Plant," INEEL/EXT-04-02331, Sep. 2004, Idaho National Engineering and Environmental Laboratory, Idaho Falls, Idaho.

TRISO-Coated Particle Fuel Phenomenon Identification and Ranking Tables (PIRTs) for Fission Product Transport Due to Manufacturing, Operations, and Accidents, NUREG-6844, vol. 1, Jul. 2004, U.S. Nuclear Regulatory Commission, Washington, DC.

TRISO-Coated Particle Fuel Phenomenon Identification and Ranking Tables (PIRTs) for Fission Product Transport Due to Manufacturing, Operations, and Accidents, Appendices A through D, NUREG-6844, vol. 2, Jul. 2004, U.S. Nuclear Regulatory Commission, Washington, DC.

TRISO-Coated Particle Fuel Phenomenon Identification and Ranking Tables (PIRTs) for Fission Product Transport Due to Manufacturing, Operations, and Accidents, Appendices E through I, NUREG-6844 vol. 3, Jul. 2004, U.S. Nuclear Regulatory Commission, Washington, DC.

International Preliminary Report on Patentability issued Jun. 4, 2013, in International Patent Application No. PCT/US2011/062560, filed Nov. 30, 2011.

* cited by examiner

FULLY CERAMIC NUCLEAR FUEL AND RELATED METHODS

STATEMENT OF FEDERALLY SPONSORED RESEARCH

The United States Government has certain rights in this invention pursuant to Contract No. DE-AC05-00OR22725 between the United States Department of Energy and UT-Battelle, LLC.

FIELD OF THE INVENTION

The present invention relates generally to nuclear technologies. More specifically, particular embodiments of the invention relate to nuclear fuels, and related methods, for use in various types of nuclear reactors and/or waste disposal systems.

DESCRIPTION OF RELATED ART

Despite nuclear power has provided a reliable, safe source of electricity in the United States for more than 40 years, no new nuclear power plant has been built in the United States since 1978, mainly because of concerns over, among others, inherent dangers associated with nuclear reactors, nuclear waste storage and disposal, and costs. Yet, to meet the increasing demands for power as well as environmental friendliness, nuclear power is destined to make a comeback in the United States since nuclear power is currently the only environment-friendly, large-scale, and reliable source of energy. The degree of use and acceptance of nuclear power, however, will primarily depend on whether the nuclear industry finds acceptable ways to reduce nuclear wastes (including the growing amount of spent fuel stored in existing nuclear power plants) and to make nuclear power economically more competitive.

One of the proposed concepts for reducing the nuclear wastes is to increase discharge burnup of nuclear fuel. By increasing the fraction of fission per initial heavy metal atom (FIMA) in the nuclear fuel, the overall spent fuel volume and long-lived radioactive isotope inventories can be significantly reduced. Moreover, extracting more energy per unit mass of fuel naturally translates into lengthened fuel cycle, reduced fuel consumption and, hence, reduced overall fuel cost.

Higher burnup of fuel, however, may pose a challenge on the performance and overall integrity of the fuel. For example, the vast majority of nuclear fuel used today are uranium dioxide ($UO_2$) pellets stacked inside a sealed cladding tube of zirconium alloy to make a fuel rod. For such a monolithic $UO_2$ fuel with zircalloy cladding, increasing burnup generally results in: increased corrosion of the cladding material due to higher neutron fluence and/or extended in-core residence; higher fuel rod internal pressures due to higher fission product gas release from the $UO_2$ fuel; poor thermal conductivity and strength of the $UO_2$ fuel; and/or higher swelling of the $UO_2$ fuel due to fission gas formation and damages to the lattice of the fuel pellets. Since this type of fuel generally has a single containment (i.e., cladding tube) against fission product release to the coolant, the material deterioration is the most critical barrier to increasing burnup of nuclear fuel.

Recently, micro-encapsulated tristructural-isotropic (TRISO) fuel particles compacted within a graphite matrix have been proposed for the next generation gas-cooled reactors. A TRISO fuel particle comprises a kernel of fissile/fertile material coated with several isotropic layers of pyrolytic carbon (PyC) and silicon carbide (SiC). These TRISO particles are combined with a graphite matrix material and pressed into a specific shape. While the TRISO fuel forms offer better fission product retention at higher temperatures and burnups than metallic fuel forms, they also provide only one containment shell (i.e., SiC layer) against fission product release to the coolant, and some fission products may migrate out of the kernel and through the outer layers and escape into the graphite matrix and coolant.

Thus, there exists a need for an improved nuclear fuel that provides enhanced fission product retention mechanisms and/or permits higher fuel burnup without compromising the integrity and stability of the fuel.

There also exists a need for a more efficient and/or safer low enrichment uranium (LEU) fuel for existing reactors, which would prevent fission products from being dispersed into the coolant under any accident conditions.

SUMMARY OF THE INVENTION

Although the present invention may obviate one or more of the above-mentioned needs, it should be understood that some aspects of the invention might not necessarily obviate one or more of those needs.

In the following description, certain aspects and embodiments will become evident. It should be understood that these aspects and embodiments are merely exemplary and the invention, in its broadest sense, could be practiced without having one or more features of these aspects and embodiments.

To attain the advantages and in accordance with the purpose of the invention, as embodied and broadly described herein, one aspect of the invention may provide a nuclear fuel comprising a fuel element comprising a plurality of tristructural-isotropic fuel particles embedded in a silicon carbide matrix.

In some exemplary embodiments, each of the tristructural-isotropic fuel particles may comprise a fuel kernel disposed substantially at the center and a ceramic layer surrounding the fuel kernel. In another exemplary embodiment, the fuel element may have a shape of a cylindrical pellet. In still another exemplary embodiment, the silicon carbide matrix may have a density substantially equal to the theoretical density.

According to one exemplary embodiment, the nuclear fuel may further include: a tubular enclosure defining an interior space, wherein an outer surface of the tubular enclosure is configured to contact a coolant of a nuclear reactor; and a plurality of fuel element disposed in the interior space. The tubular enclosure may be a metallic cladding tube.

According to another exemplary embodiment, the nuclear fuel may further comprise a graphite block having one or more holes, wherein the fuel element is disposed inside the one or more holes.

In still another exemplary embodiment, the plurality of tristructural-isotropic fuel particles may comprise transuranic elements extracted from a spent fuel of a light water reactor or from a nuclear weapon.

Another exemplary aspect of the present invention may provide a method of manufacturing a nuclear fuel. The method may comprise: providing a plurality of tristructural-isotropic fuel particles; mixing the plurality of tristructural-isotropic fuel particles with silicon carbide powder to form a precursor mixture; and compacting the precursor mixture at a predetermined pressure and temperature.

In one exemplary embodiment, the predetermined pressure may be at about 10 MPa. The predetermined temperature may be at about 1850° C.

According to another exemplary embodiment, compacting may comprise placing the precursor mixture in a mold having a predetermined shape and pressing the mixture to stress.

In some exemplary embodiments, the SiC powder may have an average particle size of less than 1 μm. According to another exemplary embodiment, the SiC powder may have an average specific surface area greater than 20 m$^2$/g.

In various exemplary embodiments, the method may further comprise adding sintering additives to the precursor mixture. The sintering additives may comprise at least one of alumina and rare earth oxides. The sintering additives may comprise about 6 to 10 weight % of the precursor mixture.

According to one exemplary embodiment, the tristructural-isotropic fuel particles may be formed by coating fuel kernels with at least one ceramic layer.

In another exemplary embodiment, the plurality of tristructural-isotropic fuel particles may comprise transuranic waste extracted from a spent fuel of a light water reactor.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
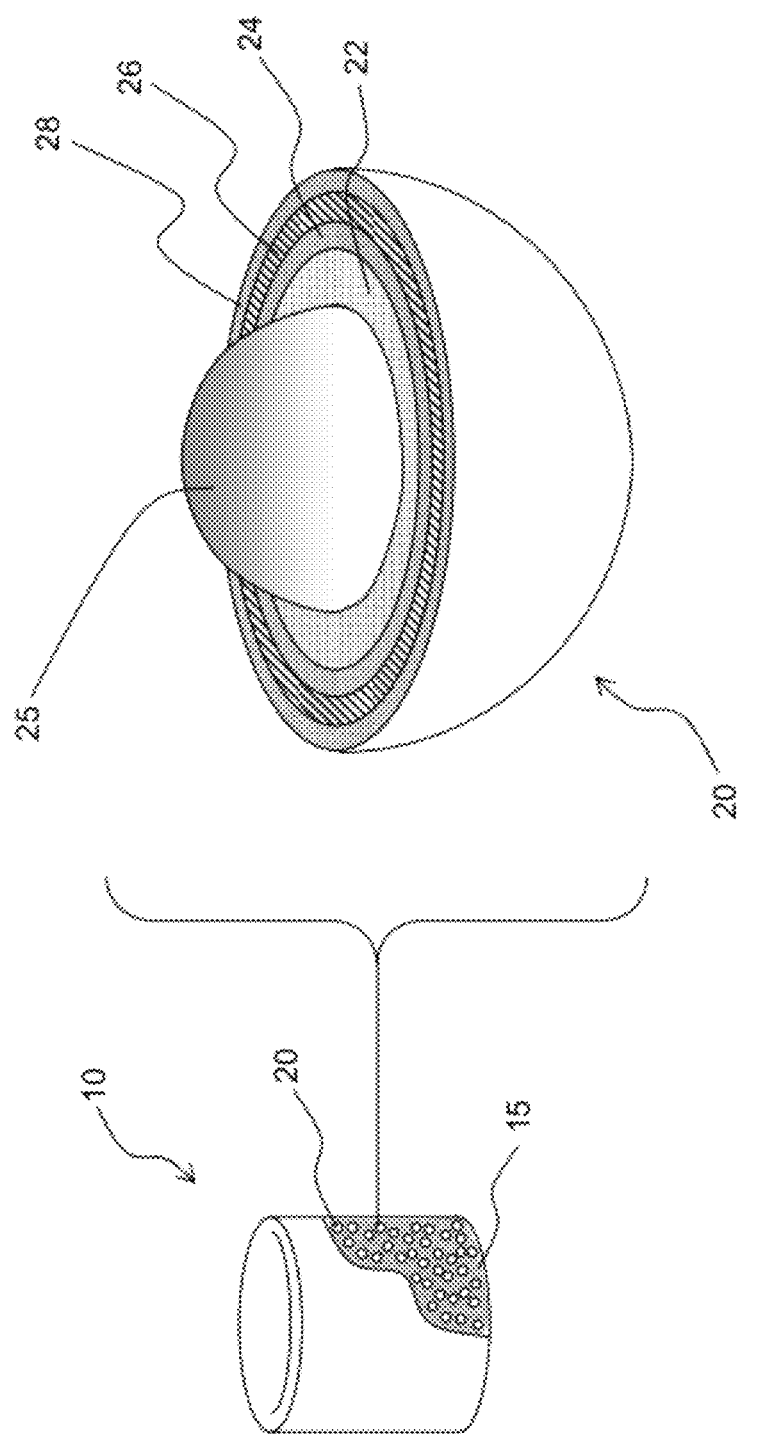
FIG. 1 is a schematic illustration of various constituents of a fuel element, according to one exemplary embodiment of the invention.

Reference will now be made in detail to the exemplary embodiments consistent with the present invention, examples of which are illustrated in the accompanying drawings. Wherever possible, the same reference characters will be used throughout the drawings to refer to the same or like parts.

Figure 2:
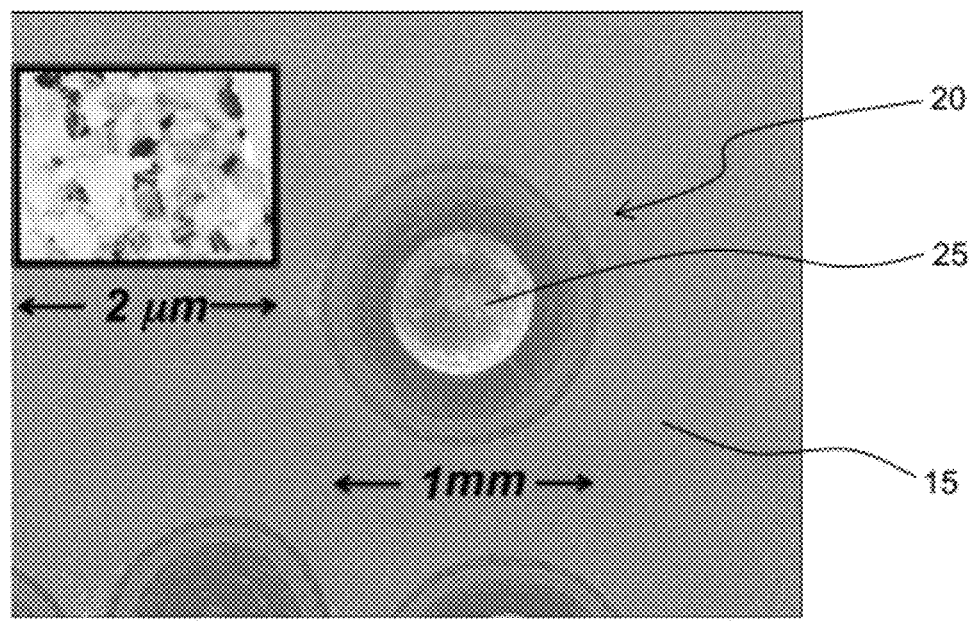
FIG. 2 is a partial cross-sectional, microscopic view of the fuel element shown in FIG. 1.
Figure 3:
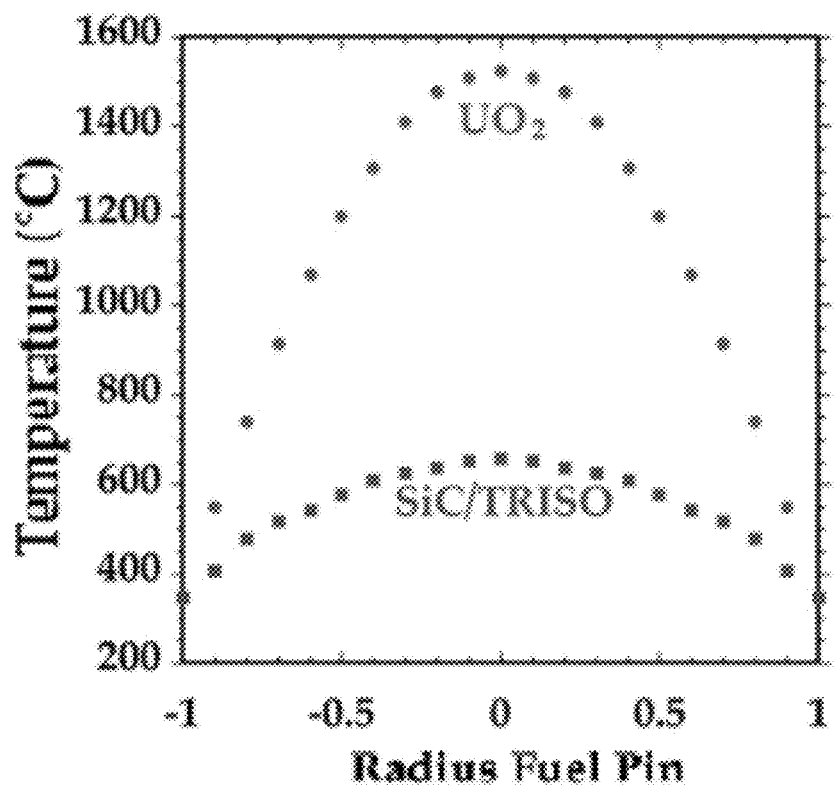
FIG. 3 is a graph illustrating a temperature profile of the fuel element of FIG. 1 as compared to a conventional UO$_2$ fuel element.

FIGS. 1-3 illustrate an exemplary nuclear fuel element consistent with various aspects of the present invention. While the invention will be described in connection with particular reactor types (e.g., light water reactors and gas-cooled reactors), embodiments of the invention may be used, or modified for use, in any other types of nuclear reactors, such as heavy water reactors, liquid metal reactors, and thermoionic nuclear converters. Moreover, certain aspects of the invention may be applied to, or used in connection with, reprocessing of spent nuclear fuel for refueling, storage, or permanent disposal.

Referring to FIG. 1, a fuel element 10, according to one exemplary embodiment, may comprise a plurality of micro-encapsulated fuel particles 20 embedded in a silicon carbide (SiC) matrix 15. The fuel element 10 may be formed by compressing a mixture of the fuel particles 20 and a SiC-based matrix precursor material in a mold. The mold may have any desired shape for the fuel element 10. In one exemplary embodiment, the SiC-based matrix precursor material may comprise SiC powder mixed with sintering additives and may be in a form of powder-based slurry, ceramic slurry for tape casting, or any other mixture type known in the art. Because the SiC matrix 15 is a ceramic material, the fuel element 10 is sometimes referred to as a fully ceramic micro-encapsulated fuel element.

While the fuel element 10 of FIG. 1 has a shape of a cylindrical pellet, particularly suitable for use in a conventional light water reactor, the fuel element may have a variety of other shapes, such as, for example, a sphere or an elongated rod, depending on the type and/or operational characteristics of the nuclear reactor in which the fuel element is intended to be used. The fabrication process and the resulting properties and characteristics of the fuel element 10 will be described in more detail later.

The fuel particles 20 dispersed in the SiC matrix 15 may be tristructural-isotropic (TRISO) fuel particles. The term "TRISO fuel particle," as used herein, may refer to any type of micro fuel particle comprising a fuel kernel and one or more layers of isotropic materials surrounding the fuel kernel. By way of example only, the fuel particle 20 may have a diameter of about 1 millimeter.

As shown in FIG. 1, the fuel particle 20 may comprise a fuel kernel 25 at its center. The fuel kernel 25 may comprise fissile and/or fertile materials (e.g., uranium, plutonium, thorium, etc.) in an oxide, carbide, or oxycarbide form. In one exemplary embodiment, the fuel kernel 25 may comprise low enriched uranium (LEU) of any suitable enrichment level.

When the fuel element 10 is used for waste mitigation and/or disposal purposes, the fuel kernel 25 may alternatively or additionally comprise transuranics (TRU) and/or fission products extracted or otherwise reprocessed from spent fuels.

For example, the fuel element 10 may be used for destruction of transuranic waste generated from, for example, light water reactors or decommissioned nuclear weapons. For that purpose, the fuel element 10 may include fuel kernels 25 formed of transuranic elements extracted from a spent fuel of a light water reactor and/or a core of a nuclear weapon. According to one exemplary embodiment, the fuel element 10 thus formed may be used as fuel for a light water reactor to destroy the transuranic waste while, at the same time, generating power from it.

The fuel kernel 25 may be coated with four distinct layers: (1) a porous carbon buffer layer 22; (2) an inner pyrolytic carbon (PyC) layer 24; (3) the ceramic layer 26; and (4) an outer PyC layer 28.

The porous carbon buffer layer 22 surrounds the fuel kernel 25 and serves as a reservoir for accommodating buildup of fission gases diffusing out of the fuel kernel 25 and any mechanical deformation that the fuel kernel 25 may undergo during the fuel cycle.

The inner PyC layer 24 may be formed of relatively dense PyC and seals the carbon buffer layer 22.

The ceramic layer 26 may be formed of a SiC material and serve as a primary fission product barrier and a pressure vessel for the fuel kernel 25, retaining gaseous and metallic fission products therein. The ceramic layer 26 also provides overall structural integrity of the fuel particle 20.

In some exemplary embodiments, the SiC layer 26 may be replaced or supplemented with zirconium carbide (ZrC) or any other suitable material having similar properties as those of SiC and/or ZrC.

The outer PyC layer 28 protects the SiC layer 26 from chemical attack during operation and acts as an additional diffusion boundary to the fission products. The outer PyC layer 28 may also serve as a substrate for bonding to the surrounding matrix material.

The configuration and/or composition of the fuel particle are not limited to the embodiments described above. Instead, it should be understood that a fuel particle consistent with the present disclosure may include one or more additional layers, or omit one or more layers, depending on the desired properties of the fuel particle. For example, the fuel particle 20 may be overcoated with the SiC matrix material (i.e., SiC layer) prior to being mixed and compressed with the SiC powder.

An exemplary method of fabricating the fuel element 10, according to another aspect of the present invention, will be described herein.

To form the fuel particles 20, according to one exemplary embodiment, the material for the fuel kernel 25 may be dissolved in a nitric acid to form a solution (e.g., uranyl nitrate). The solution is then dropped through a small nozzle or orifice to form droplets or microspheres. The dropped microspheres are then gelled and calcined at high temperature to produce the fuel kernels 25. The fuel kernels 25 may then be run through a suitable coating chamber, such as a CVD furnace, in which desired layers are sequentially coated onto the fuel kernels 25 with high precision. It should be understood that any other fabrication method known in the art may be additionally or alternatively used to form the fuel kernels 25.

Once the fuel particles 20 are prepared, the fuel particles 20 are mixed with SiC powder, which comprises the precursor for the SiC matrix 15. Prior to the mixing, the fuel particles 20 may be coated with a suitable surface protection material. The SiC powder may have an average size of less than 1 μm and/or a specific surface area greater than 20 m$^2$/g. By way of example only, the size of the SiC powder may range from about 15 nm to about 51 nm with the mean particle size being about 35 nm.

During or prior to mixing, sintering additives, such as, for example, alumina and rare earth oxides, may be added to the SiC powder and/or coated onto the SiC powder surface. In one exemplary embodiment, the amount of additives may range from about 6 weight % to 10 weight %. When mixing with the fuel particles 20, the SiC-based precursor material containing the SiC powder may be in a variety of physical states (e.g., powder, liquid, slurry, etc.) depending on the mixing and/or fabrication method used.

The SiC-based precursor mixed with the fuel particles 20 may then be pressed to stress at a predetermined pressure and temperature to form the fuel element 10. According to one exemplary embodiment, the sintering pressure and temperature during the press may be less than about 30 MPa and 1900° C., respectively. Preferably, the sintering pressure and temperature may be about 10 MPa and 1850° C., respectively. The duration of the press may be less than or equal to about one hour, but it may take more than one hour.

The small size or large specific surface area of the SiC powder, with the limited mass fraction of the sintering additives, may enable the formation of highly crystalline, near-full density, SiC matrix at conditions sufficient to ensure the integrity of the fuel particles 20. The SiC matrix provides an additional barrier to fission products that may be released during normal operation and accident temperatures and contaminate the coolant of the reactor. The SiC matrix also helps containing fission products after disposal.

For example, FIG. 2 shows a microscopic, partial cross-sectional view of the fuel element 10 fabricated with a method consistent with the present invention. As can be seen from the figure, the fuel element 10 has very clean interfaces between the fuel particles 20 and the SiC matrix 15. Further, the SiC matrix 15 has a very low porosity (e.g., only about 3~4% closed microporosity), forming a gas-impermeable barrier that acts as a secondary barrier to fission products/actinides diffusion and other radioactivity releases from the fuel particles 20.

In addition, the SiC matrix 15 has very low permeability to helium (e.g., in the order of about $10^{-10}$ to $10^{-11}$ m$^2$/s), which is substantially lower than that of graphite and makes it particularly suitable for a gas cooled reactor that uses helium as a coolant. Low permeability of the SiC matrix 15 may also ensure retention of fission product gas.

FIG. 3 illustrates a temperature gradient inside the fuel element 10 at an operating condition, with a comparison to a conventional UO$_2$ fuel element. As shown in the figure, the fuel element 10 consistent with the present invention may have substantially higher thermal conductivity than that of the UO$_2$ fuel element. Higher thermal conductivity has many beneficial effects.

For example, higher thermal conductivity may permit operating the nuclear reactor at higher temperature. Operating a reactor at higher temperature may increase the efficiency and the power density, which may permit reduction of the reactor size. Higher thermal conductivity may also permit higher burnup of the fuel element while maintaining the overall fuel integrity. Moreover, as briefly mentioned above, higher burnup may not only reduce the overall waste volume but also limit possible nuclear proliferation and diversion opportunities. Further, the fuel with high thermal conductivity may undergo less severe temperature transients during an accident condition, such as a loss of coolant accident (LOCA). In a light water reactor operating conditions, migration of fission products (including gases) outside the TRISO fuel particles and the SiC matrix is not expected to occur.

Further, the SiC matrix 15 has higher fracture strength, higher irradiation resistance, and lower irradiation swelling than graphite or UO$_2$. Combination of better irradiation performance and better thermal conductivity may result in better mechanical performance as compared to graphite or UO$_2$ fuel element. The resulting matrix 15 is considered a near-stoichiometric, radiation-resistant, form of SiC, allowing the fuel element 10 to be repository-stable for direct disposal even after substantial burnup (e.g., 60~99% burnup).

Figure 4:
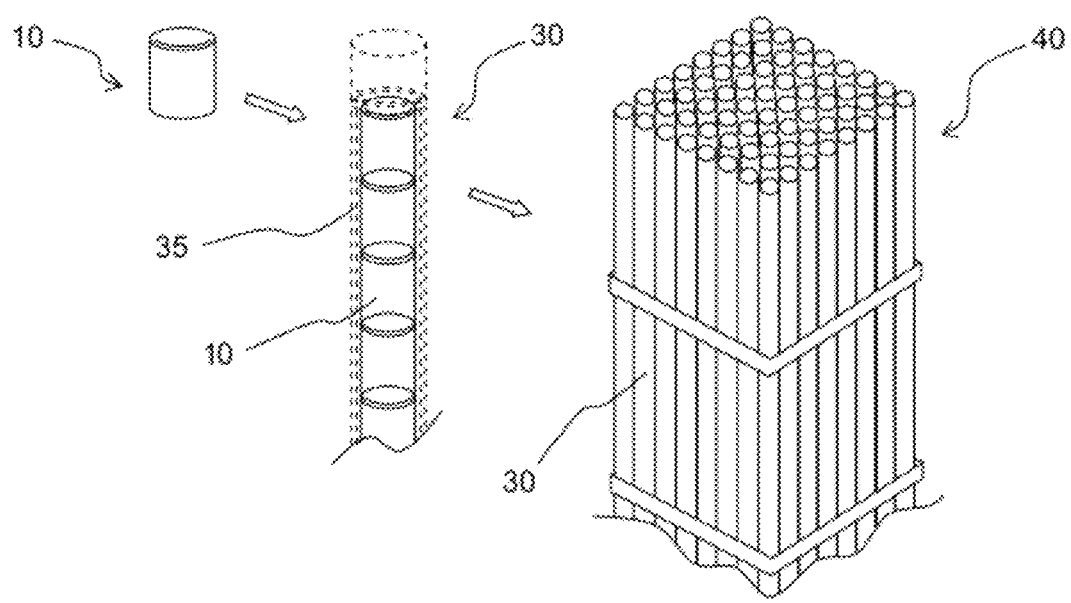
FIG. 4 is a schematic illustration of an exemplary application of the fuel element, consistent with the present invention.
Figure 5:
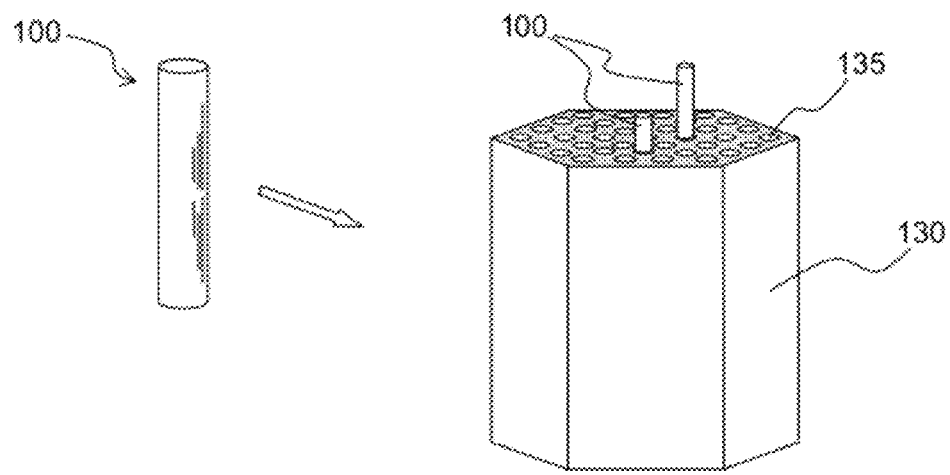
FIG. 5 is a schematic illustration of another exemplary application of the fuel element, consistent with present invention.

Now, with reference to FIGS. 4 and 5, exemplary applications of the fuel element 10, according to various aspects of the present invention, are described.

In one exemplary embodiment, one or more fuel elements 10 may be enclosed in a metallic cladding tube 35 or any other suitable enclosure to form a fuel rod 30, as shown in FIG. 4. When the fuel elements 10 are enclosed inside the cladding tube 35 or an enclosure, the cladding tube 35 or the enclosure may provide an additional barrier (i.e., in addition to the pressure-bearing ceramic coating around the fuel kernel 25 and the fully ceramic SiC matrix 15) to fission products and actinide transport from the fuel particles 20. One or more fuel rods 30 may then be placed in a fuel bundle 40 for use in, for example, a light water reactor. Thus, according to one exemplary aspect, the fuel element 10 consistent with the present invention may be used in a conventional light water reactor, as replacement fuel for conventional UO$_2$ fuel pellets, which may provide enhanced thermal conductivity and irradiation stability, as well as added barriers to fission product and actinide transport.

According to another aspect of the present invention, the fuel element 100 may be provided as an elongated rod, as shown in FIG. 5. The fuel element 100 may be placed in a hole 135 drilled in a graphite prism or block for use in a gas-cooled reactor. As mentioned above, the fully ceramic fuel element 100, consistent with the present invention, may exhibit higher fracture strength, higher irradiation resistance, and lower irradiation swelling than the conventional graphite matrix-based fuel.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A nuclear fuel comprising:
a fuel element comprising a plurality of tristructural-isotropic fuel particles intermixed in a silicon carbide matrix, wherein the silicon carbide matrix separates at least one of the plurality of tristructural-isotropic fuel particles embedded in the silicon carbide matrix from the other tristructural-isotropic fuel particles embedded in the silicon carbide matrix, wherein the silicon carbide matrix has a density substantially equal to the theoretical density of stoichiometric silicon carbide.

2. The nuclear fuel of claim 1, wherein each of the tristructural-isotropic fuel particles comprises a fuel kernel disposed substantially at the center and a ceramic layer surrounding the fuel kernel.

3. The nuclear fuel of claim 1, wherein the fuel element has a shape of a cylindrical pellet.

4. The nuclear fuel of claim 1, further comprising:
a tubular enclosure defining an interior space, wherein an outer surface of the tubular enclosure is configured to contact a coolant of a nuclear reactor,
wherein the fuel element is disposed in the interior space.

5. The nuclear fuel of claim 4, wherein the tubular enclosure is a metallic cladding tube.

6. The nuclear fuel of claim 1, further comprising a graphite block having one or more holes, wherein the fuel element is disposed inside the one or more holes.

7. The nuclear fuel of claim 1, wherein the plurality of tristructural-isotropic fuel particles comprise transuranic elements extracted from a spent fuel of a light water reactor.

8. The nuclear fuel of claim 1, wherein the plurality of tristructural-isotropic fuel particles comprise transuranic elements extracted from a nuclear weapon.

9. A nuclear fuel comprising:
a fuel element comprising a plurality of tristructural-isotropic fuel particles intermixed in a silicon carbide matrix, wherein the silicon carbide matrix separates at least one of the plurality of tristructural-isotropic fuel particles embedded in the silicon carbide matrix from the other tristructural-isotropic fuel particles embedded in the silicon carbide matrix, wherein the silicon carbide matrix is near-stoichiometric and has pockets of porosity of not more than 4%, and wherein the pockets include only rare earth oxides or tramp elements.

10. The nuclear fuel of claim 9, wherein the fuel element has a shape of a cylindrical pellet.

11. The nuclear fuel of claim 9, further comprising:
a tubular enclosure defining an interior space, wherein an outer surface of the tubular enclosure is configured to contact a coolant of a nuclear reactor,
wherein the fuel element is disposed in the interior space.

12. The nuclear fuel of claim 9, further comprising a graphite block having one or more holes, wherein the fuel element is disposed inside the one or more holes.

13. The nuclear fuel of claim 9, wherein the plurality of tristructural-isotropic fuel particles comprise transuranic elements extracted from a spent fuel of a light water reactor.

14. The nuclear fuel of claim 9, wherein the plurality of tristructural-isotropic fuel particles comprise transuranic elements extracted from a nuclear weapon.

* * * * *